(12) United States Patent
Nagao et al.

(10) Patent No.: US 11,740,799 B2
(45) Date of Patent: *Aug. 29, 2023

(54) STORAGE SYSTEM AND INPUT AND OUTPUT CONTROL METHOD

(71) Applicant: Hitachi, Ltd., Tokyo (JP)

(72) Inventors: Takashi Nagao, Tokyo (JP); Yuusaku Kiyota, Tokyo (JP); Hideaki Monji, Tokyo (JP); Tomohiro Yoshihara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,002

(22) Filed: Apr. 8, 2022

(65) Prior Publication Data

US 2022/0229561 A1 Jul. 21, 2022

Related U.S. Application Data

(63) Continuation of application No. 16/995,909, filed on Aug. 18, 2020, now Pat. No. 11,327,660.

(30) Foreign Application Priority Data

Feb. 7, 2020 (JP) .................................. 2020-19794

(51) Int. Cl.
*G06F 3/06* (2006.01)

(52) U.S. Cl.
CPC .......... *G06F 3/0613* (2013.01); *G06F 3/0619* (2013.01); *G06F 3/0622* (2013.01);
(Continued)

(58) Field of Classification Search
CPC .... G06F 3/0613; G06F 3/0619; G06F 3/0622; G06F 3/0653; G06F 3/0659;
(Continued)

(56) References Cited

U.S. PATENT DOCUMENTS 6,981,070 B1* 12/2005 Luk ........................ G06F 3/0656
710/33
11,327,660 B2* 5/2022 Nagao ..................... G06F 3/061
(Continued)

FOREIGN PATENT DOCUMENTS

JP  2001-307420 A  11/2001
JP  2005-157815 A   6/2005
(Continued)

OTHER PUBLICATIONS

Japanese Office Action received in corresponding Japanese Application No. 2022-022520 dated Nov. 1, 2022.

*Primary Examiner* — Hiep T Nguyen
(74) *Attorney, Agent, or Firm* — MATTINGLY & MALUR, PC

(57) ABSTRACT

A storage system having high reliability and IO processing performance is realized. The storage system includes: a first arithmetic unit configured to receive an input and output request and perform data input and output processing; a first memory connected to the first arithmetic unit; a plurality of storage drives configured to store data; a second arithmetic unit; and a second memory connected to the second arithmetic unit. The first arithmetic unit instructs the storage drive to read data, the storage drive reads the data and stores the data in the second memory, the second arithmetic unit stores the data stored in the second memory in the first memory, and the first arithmetic unit transmits the data stored in the first memory to a request source of a read request for the data.

12 Claims, 4 Drawing Sheets

(52) U.S. Cl.
CPC .......... *G06F 3/0653* (2013.01); *G06F 3/0659* (2013.01); *G06F 3/0673* (2013.01)

(58) Field of Classification Search
CPC ...... G06F 3/0673; G06F 3/061; G06F 3/0671; G06F 3/0658; G06F 3/0656
See application file for complete search history.

(56) References Cited

U.S. PATENT DOCUMENTS

| | | |
|---|---|---|
| 2001/0011325 A1 | 8/2001 | Day, III |
| 2005/0114592 A1 | 5/2005 | Jin et al. |
| 2009/0193289 A1* | 7/2009 | Hsu .................... G06F 11/1474 |
| | | 714/E11.127 |
| 2019/0303022 A1 | 10/2019 | Matsugami et al. |
| 2020/0183840 A1 | 6/2020 | Johns |
| 2020/0192601 A1 | 6/2020 | Okada et al. |

FOREIGN PATENT DOCUMENTS

| | | |
|---|---|---|
| JP | 2019-174994 A | 10/2019 |
| WO | 2017/195324 A1 | 11/2017 |

\* cited by examiner

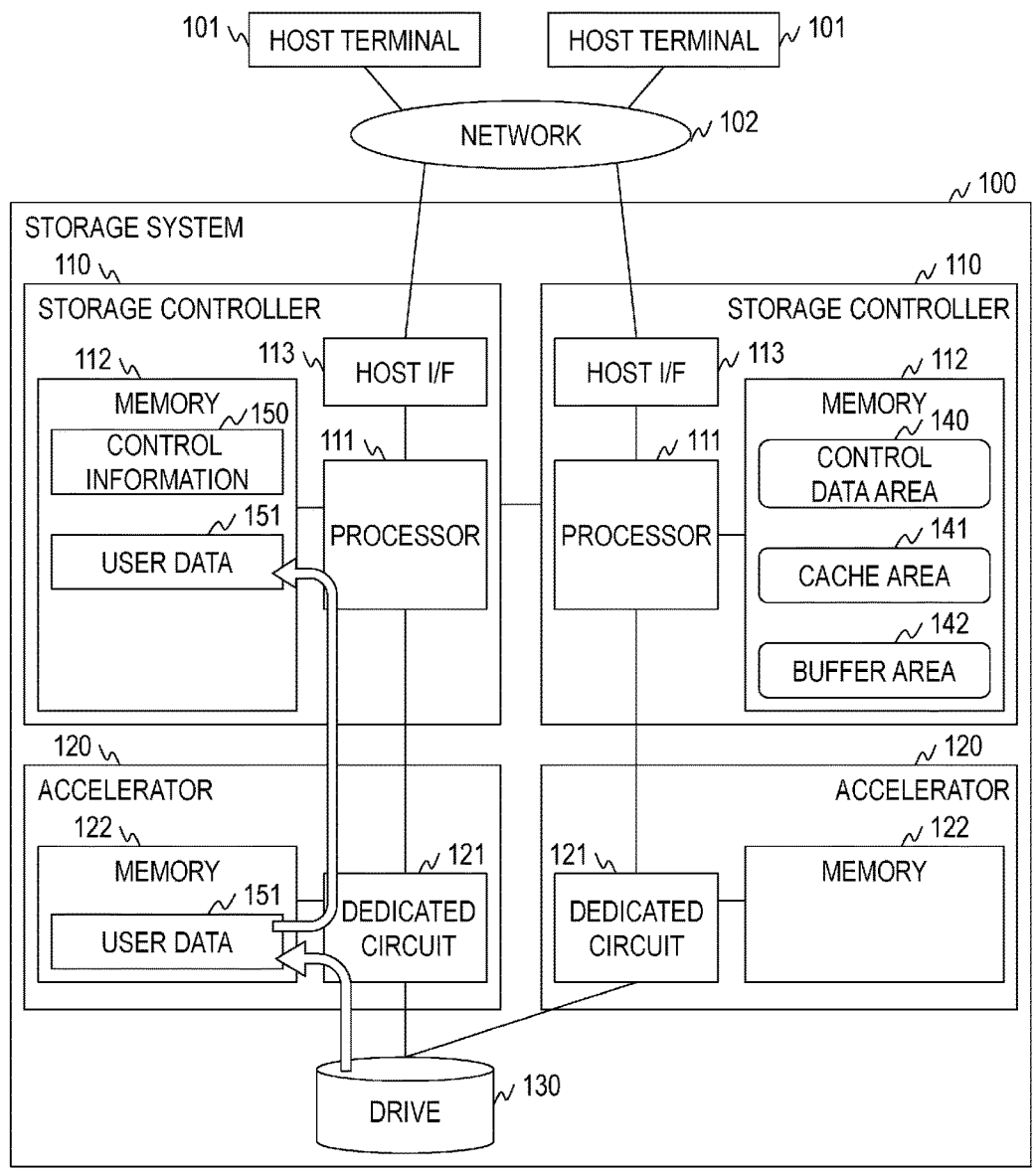

FIG. 3

| ACCESS SOURCE | VIRTUAL ADDRESS |
|---|---|
| STORAGE CONTROLLER #1: PROCESSOR | 0x8000-0x8FFF |
| | 0xA000-0xAFFF |
| ACCELERATOR #1: DEDICATED CIRCUIT | 0x8000-0x8FFF |
| | 0xA000-0xAFFF |
| DRIVE | 0x7000-0x7FFF |
| | 0xA000-0xAFFF |

START
↓
GENERATE MEMORY SPACE MANAGEMENT TABLE — S101
↓
REGISTER ENTRY OF STORAGE CONTROLLER IN MEMORY ACCESS PERMISSION TABLE — S102
↓
REGISTER ENTRY OF ACCELERATOR IN MEMORY ACCESS PERMISSION TABLE — S103
↓
REGISTER ADDRESS OF DRIVE IN MEMORY ACCESS PERMISSION TABLE — S104
↓
END

STORAGE SYSTEM AND INPUT AND OUTPUT CONTROL METHOD

CLAIM OF PRIORITY

The present application claims priority from Japanese patent application JP 2020-19794 filed on Feb. 7, 2020, the content of which is hereby incorporated by reference into this application.

BACKGROUND OF THE INVENTION

1. Field of the Invention

The present invention relates to a storage system.

2. Description of the Related Art

A storage system includes a controller and a plurality of storage drives. The controller is connected to the plurality of storage drives via a backend switch. Serial Attached SCSI (SAS) is generally used as a communication standard between the controller and the storage drive. An SAS communication path requires a dedicated interface for performing communication processing of each protocol. Since the storage system having the SAS communication path can prevent writing of erroneous data or the like, high reliability can be realized.

In recent years, non-volatile memory express (NVMe) is used as one of new communication standards. In a storage system employing NVMe, a controller and a storage drive are connected via a PCI Express bus (PCIe bus) (PCI Express and PCIe are registered trademark, hereinafter the same). The storage drive can directly access a memory provided in the controller. Since processing of an SAS protocol is not required by using NVMe, it is expected to improve performance of IO processing.

In the storage system employing NVMe, since control for ensuring the reliability such as the SAS protocol is not performed, transfer of erroneous data from the storage drive cannot be prevented. On the other hand, a technique described in WO 2017/195324 (Patent Literature 1) is known.

Patent Literature 1 describes a method of controlling an access from a storage drive by rewriting an IO page table as necessary so as to avoid data destruction due to writing of erroneous data to a cache area.

In data read processing using control described in Patent Literature 1, a controller controls a storage drive to write data to a buffer data area, writes the data from the buffer data area to a cache area, and then transmits the data to a host.

In the above-described processing, there is a problem that writing data to a memory is performed twice in the read processing, and an amount of consumption of a memory band is large. Therefore, speed-up of data transfer is hindered.

SUMMARY OF THE INVENTION

An object of the invention is to realize a storage system having high reliability and a high-speed data transfer.

A representative example of the invention disclosed in the present application is as follows. That is, a storage system includes: a first arithmetic unit configured to receive an input and output request and perform data input and output processing; a first memory connected to the first arithmetic unit; a plurality of storage drives configured to store data; a second arithmetic unit; and a second memory connected to the second arithmetic unit The first arithmetic unit instructs the storage drive to read data, the storage drive reads the data and stores the data in the second memory, the second arithmetic unit stores the data stored in the second memory in the first memory, and the first arithmetic unit transmits the data stored in the first memory to a request source of a read request for the data.

According to the invention, a storage system having high reliability and a high-speed data transfer can be realized. Problems, configurations and effects other than those described above will become apparent from the following description of the embodiments.

BRIEF DESCRIPTION OF THE DRAWINGS

FIG. 1 is a diagram showing an example of a configuration of a computer system according to a first embodiment.

FIG. 2 is a diagram showing an example of a memory space management table according to the first embodiment.

FIG. 3 is a diagram showing an example of a memory access permission table according to the first embodiment.

FIG. 4 is a flowchart showing an example of initialization processing executed by a storage controller according to the first embodiment.

DESCRIPTION OF EMBODIMENTS

Figure 5:
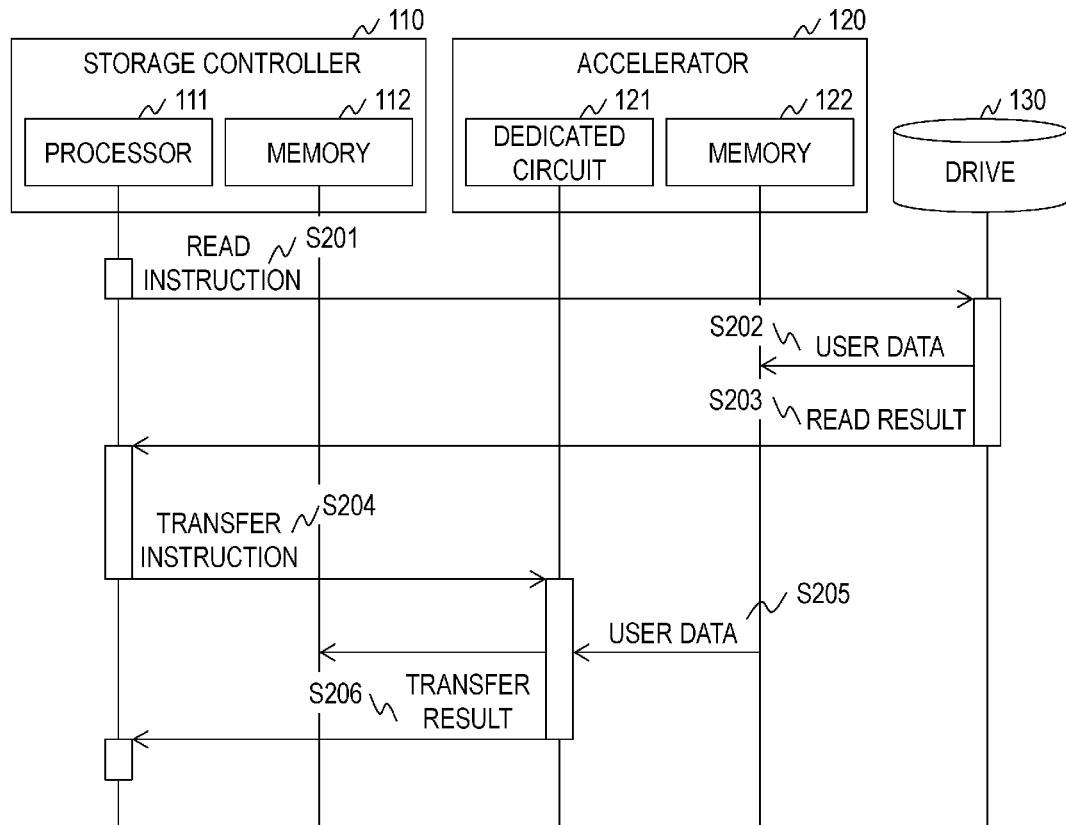
FIG. 5 is a sequence diagram showing a flow of processing executed when the storage system according to the first embodiment reads user data from a drive.

Embodiments of the invention will be described below with reference to the drawings. However, the invention should not be construed as being limited to the description of the embodiments described below. Those skilled in the art could have easily understood that specific configurations can be changed without departing from the spirit or scope of the invention.

In configurations of the invention described below, the same or similar configurations or functions are denoted by the same reference numerals, and a repeated description thereof is omitted.

Terms "first", "second", "third", and the like in the present specification are used to identify the constituent elements, and do not necessarily limit the number or order.

First Embodiment

FIG. 1 is a diagram showing an example of a configuration of a computer system according to a first embodiment.

The computer system includes a storage system 100 and host terminals 101. The storage system 100 is connected to the host terminal 101 via a network 102. The computer system may include a plurality of storage systems 100. In this case, the storage systems 100 are connected to each other via a network (not shown).

The network 102 is, for example, a storage area network (SAN), a local area network (LAN), and a wide area network (WAN). A connection method of the network 102 may be either wireless or wired.

The host terminal 101 is a computer that writes data to a storage area provided by the storage system 100 and reads the data from the storage area. The host terminal 101 includes a processor, a memory, and an interface, which are not shown.

The storage system 100 provides the storage area to the host terminals 101. The storage system 100 includes a plurality of storage controllers 110, a plurality of accelerators 120, and a plurality of drives 130. The storage controllers 110 are connected via a PCIe bus. The storage controller 110 and the accelerator 120 are connected via the PCIe bus. In addition, the accelerator 120 and the drive 130 are connected via the PCIe bus.

The drive 130 is a device that provides the storage area used by the host terminal 101. The drive 130 according to the first embodiment is an NVMe drive that performs processing conforming to an NVMe protocol. The drive 130 may include an SATA drive or the like. In addition, the drive 130 may be a single-port NVMe SSD connected to a PCI express switch that is connected to two CTLs, or may be a dual port NVMe SSD having high availability.

The storage controller 110 is hardware that controls the storage system 100. The storage controller 110 includes a processor 111, a memory 112, and a host interface 113.

The processor 111 is hardware that performs various calculations. The processor 111 executes a program stored in the memory 112. The processor 111 operates as a functional unit (module) that realizes a specific function by executing processing in accordance with a program.

The processor 111 includes a plurality of cores and an input/output memory management unit (IOMMU), which are not shown. The core is hardware that executes arithmetic processing. The IOMMU controls access to the memory 112 by the accelerator 120 connected to the processor 111 via the PCIe bus based on an IO page table.

The memory 112 is a storage device including at least one of a volatile storage element such as a dynamic random access memory (DRAM) and a nonvolatile storage element such as a NAND flash, a spin transfer torque random access memory (STT-RAM), and a phase-change memory (PCM).

The memory 112 has a storage area for storing a program to be executed by the processor 111 and various kinds of information, and a storage area for storing data. Here, the storage area of the memory 112 according to the first embodiment will be described.

The memory 112 includes a control data area 140, a cache area 141, and a buffer area 142.

The control data area 140 is a storage area for storing a program and information for controlling the storage system 100. In the control data area 140, a control program (not shown), control information 150, an IO page table (not shown), and the like are stored.

The control program is a program for realizing a control function (storage control unit) of the storage system 100.

The control information 150 is information for controlling the storage system 100. The control information 150 includes, for example, data for managing data (cache data) stored in a cache directory and the cache area 141, data for managing data (buffer data) stored in the buffer area 142, a command for controlling various devices, and data shared among the storage controllers 110. The control information 150 includes data for managing an RAID configuration, information for managing a correspondence relationship between the drive 130 and the storage area provided for the host terminal 101. The control information 150 includes a memory space management table 200 (see FIG. 2) and a memory access permission table 300 (see FIG. 3).

The IO page table is a table used by the IOMMU to control access to the memory 112 by the accelerator 120. Note that the processor 111 can set and update the IOMMU. In addition, the processor 111 can invalidate the IO page table stored in the IOMMU by operating a register of the IOMMU, and cache the IO page table.

The cache area 141 is a storage area for storing the cache data. The cache data is data that is predicted to be requested by the host terminal 101 for read processing in the future. The storage controller 110 reads the data from a low-speed storage drive and stores the data in the cache area 141 as cache data in advance, so that the storage controller 110 can transfer the data to the host terminal 101 at a high speed when the host terminal 101 issues a read request to the storage system 100. Therefore, the storage controller 110 needs to store the cache data until the storage controller 110 receives the read request from the host terminal 101. In addition, the storage controller 110 needs to protect the cache data from being destructed by other components. Data destruction includes, for example, an operation in which the drive 130 writes different data to the storage area of a certain cache data. The buffer area 142 is the storage area for storing the buffer data. The buffer data is data temporarily stored in the read processing and management processing of the drive 130 by the storage controller 110. The management processing includes, for example, an operation in which the storage controller 110 periodically reads temperature information from the drive 130 and changes a rotation speed of a cooling fan such that a temperature becomes a certain value or less. The buffer data is discarded after the read processing and the management processing by the storage controller 110 are completed.

The above is the description of the storage area of the memory 112. The description returns to FIG. 1.

The host interface 113 is an interface for connecting to the host terminal 101. The host interface 113 is an Ethernet adapter (Ethernet is a registered trademark), an InfiniBand, a host bus adapter, a PCI Express bridge, or the like.

The accelerator 120 is hardware that controls reading of data from the drive 130. The accelerator 120 includes a dedicated circuit 121 and a memory 122.

The dedicated circuit 121 is hardware that performs various calculations. The dedicated circuit 121 is, for example, a processor, a graphics processing unit (GPU), a field programmable gate array (FPGA), and the like. The dedicated circuit 121 executes a program stored in the memory 122. The dedicated circuit 121 operates as a functional unit (module) that realizes a specific function by executing processing in accordance with the program. The memory 122 is the same hardware as the memory 112.

FIG. 2 is a diagram showing an example of the memory space management table 200 according to the first embodiment.

The memory space management table 200 is information for managing a DRAM space mapped to a physical address space of the storage controller 110. The memory space management table 200 includes entries including a memory mounting position 201, a physical address 202, and a virtual address 203.

The memory mounting position 201 is a field for storing information on a position (hardware) on which the memory is mounted. The physical address 202 is a field for storing an address of the physical address space. The virtual address 203 is a field for storing a virtual address mapped to a physical address corresponding to the physical address 202.

The cache area 141 and the buffer area 142 of the storage controller 110 are managed in separate entries.

As shown in FIG. 2, in the present embodiment, not only the memory 112 of the storage controller 110 but also the memory 122 of the accelerator 120 is mapped to the physical address space of the storage controller 110. As a result, the storage controller 110 can treat the memory 122 of the accelerator 120 as a memory of a portion of the storage controller 110 itself.

FIG. 3 is a diagram showing an example of a memory access permission table 300 according to the first embodiment.

The memory access permission table 300 is information for controlling access of a device to the memory (memories 112, 122) managed by the storage controller 110. The memory access permission table 300 includes entries including an access source 301 and a virtual address 302.

The access source 301 is a field for storing information on a device that accesses the memories 112, 122. The virtual address 302 is a field for storing a virtual address that can be accessed by a device corresponding to the access source 301.

FIG. 4 is a flowchart showing an example of initialization processing executed by the storage controller 110 according to the first embodiment.

After the storage system 100 is started up, the storage controller 110 starts processing described below.

The storage controller 110 generates the memory space management table 200 (step S101). The memory space management table 200 is generated in physical address space setting processing in computer startup processing. Since the physical address space setting processing is a known technique, a detailed description thereof will be omitted.

Next, the storage controller 110 adds an entry of the storage controller 110 to the memory access permission table 300 (step S102). Specifically, the following processing is executed.

(S102-1) The storage controller 110 identifies the storage controller 110 itself and another storage controller 110.

(S102-2) The storage controller 110 selects the target storage controller 110 from among the identified storage controllers 110.

(S102-3) The storage controller 110 identifies the accelerator 120 that is directly connected to the target storage controller 110.

(S102-4) The storage controller 110 adds an entry to the memory access permission table 300, and sets identification information of the processor 111 provided in the target storage controller 110 to the access source 301 of the added entry. Further, the storage controller 110 sets a row of the virtual address corresponding to the cache area 141 of the memory 112 provided in the target storage controller 110 and a row of the virtual address of the memory 122 provided in the identified accelerator 120 in the virtual address 302 of the added entry.

(S102-5) The storage controller 110 determines whether the processing is completed for all the identified storage controllers 110. When the processing is not completed for all the identified storage controllers 110, the storage controller 110 returns to (S102-2) and executes the same processing. When the processing is completed for all the identified storage controllers 110, the storage controller 110 completes the processing in step S102.

Next, the storage controller 110 adds an entry of the accelerator 120 to the memory access permission table 300 (step S103). Specifically, the following processing is executed.

(S103-1) The storage controller 110 identifies the accelerator 120 that can be accessed.

(S103-2) The storage controller 110 selects the target accelerator 120 from among the identified accelerators 120.

(S103-3) The storage controller 110 identifies the storage controller 110 that is directly connected to the target accelerator 120.

(S103-4) The storage controller 110 adds an entry to the memory access permission table 300, and sets identification information of the dedicated circuit 121 provided in the target accelerator 120 to the access source 301 of the added entry. Further, the storage controller 110 sets a row of the virtual address of the memory 122 provided in the target accelerator 120 and a row of the virtual address corresponding to the cache area 141 of the memory 112 provided in the identified storage controller 110 in the virtual address 302 of the added entry.

(S103-5) The storage controller 110 determines whether the processing is completed for all the identified accelerators 120. When the processing is not completed for all the identified accelerators 120, the storage controller 110 returns to (S103-2) and executes the same processing. When the processing is completed for all the identified accelerators 120, the storage controller 110 completes the processing in step S103.

Next, the storage controller 110 adds an entry of the drive 130 to the memory access permission table 300 (step S104). Thereafter, the storage controller 110 completes the initialization processing. Specifically, the following processing is executed.

(S104-1) The storage controller 110 identifies the drive 130 that can be accessed.

(S104-2) The storage controller 110 selects the target drive 130 from among the identified drives 130.

(S104-3) The storage controller 110 identifies the accelerator 120 that is directly connected to the storage controller 110.

(S104-4) The storage controller 110 adds an entry to the memory access permission table 300, and sets the identification information of the target drive 130 to the access source 301 of the added entry. Further, the storage controller 110 sets a row of the virtual address corresponding to the buffer area 142 of the memory 122 provided in the storage controller 110 and a row of the virtual address of the memory 122 provided in the identified accelerator 120 in the virtual address 302 of the added entry.

(S104-5) The storage controller 110 determines whether the processing is completed for all the identified drives 130. When the processing is not completed for all the identified drives 130, the storage controller 110 returns to (S104-2) and executes the same processing. When the processing is completed for all the identified drives 130, the storage controller 110 completes the processing in step S104.

When the new drive 130 is added to the storage system 100, the storage controller 110 executes the processing in step S104.

FIG. 5 is a sequence diagram showing a flow of processing executed when the storage system 100 according to the first embodiment reads user data 151 from the drive 130.

The processor 111 of the storage controller 110 transmits a read instruction to the drive 130 that stores the user data 151 (step S201). The read instruction includes an address (physical address) for accessing the memory 122 provided in the accelerator 120.

When receiving the read instruction, the drive 130 writes the user data 151 to the address provided in the read instruction (step S202). At this time, the drive 130 does not need to recognize that a write destination of the data is the accelerator 120.

When the writing of the user data 151 is completed, the drive 130 transmits a read result to the storage controller 110 (step S203).

When receiving the read result, the processor 111 of the storage controller 110 transmits a transfer instruction to the accelerator 120 (step S204). The transfer instruction includes an address (physical address) for accessing the memory 112 provided in the storage controller 110.

When receiving the transfer instruction, the accelerator 120 writes the user data 151 to the address included in the transfer instruction (step S205). When the writing of the user data 151 is completed, the accelerator 120 transmits the transfer result to the storage controller 110 (step S206). After that, the storage controller 110 transmits the user data 151 to a request source.

As shown in FIG. 5, in the storage system 100 according to the first embodiment, the writing of data to the memory 112 of the storage controller 110 by the drive 130 is prohibited in principle. As a result, the transfer of erroneous data from the drive 130 can be prevented, so that the reliability can be enhanced. Further, in the data transfer, since the number of times of writing to the memory 112 of the storage controller 110 is one, an amount of consumption of a memory band is reduced.

Figure 6:
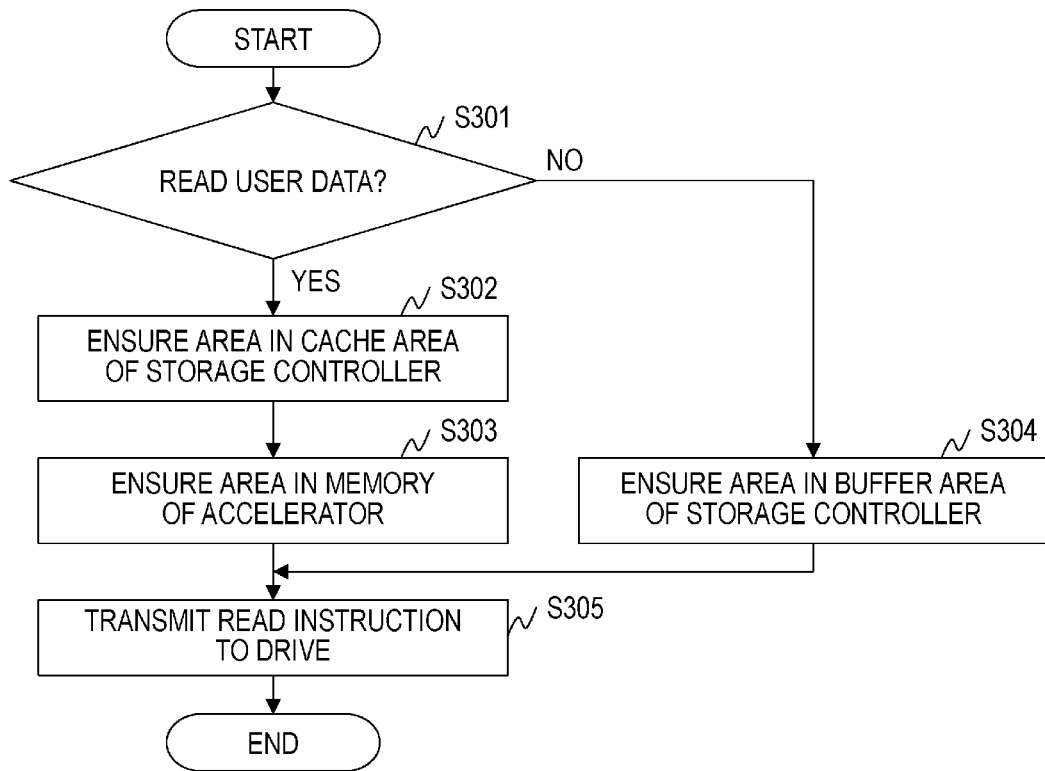
FIG. 6 is a flowchart showing an example of processing executed when the storage controller according to the first embodiment reads data stored in the drive.

FIG. 6 is a flowchart showing an example of processing executed when the storage controller 110 according to the first embodiment reads data stored in the drive 130.

The storage system 100 starts the processing described below when receiving the read request from an external device or when performing prefetch of data based on an access prediction. The external device is the host terminal 101, another storage system 100, a terminal for maintenance, and the like. The data to be accessed is status information such as the control information 150, the user data 151, and a load of the storage system 100.

The processor 111 determines whether the data to be read is the user data 151 (step S301).

When it is determined that the data to be read is the user data 151, the processor 111 ensures an area of a predetermined size in the cache area 141 of the memory 112 of the storage controller 110 (step S302). Here, ensuring an area means that exclusive control is performed such that an operation from another processing is not received. In step S302, the following processing is executed.

(S302-1) The processor 111 searches the memory access permission table 300 for the entry of the storage controller 110.

(S302-2) The processor 111 refers to the row corresponding to the memory 112 of the storage controller 110 of the virtual address 302 of the searched entry. The processor 111 selects the virtual address in a predetermined range based on the referenced row. At this time, a use state of the storage area of the memory 112 corresponding to the virtual address may be confirmed.

(S302-3) The processor 111 executes the exclusive processing on the selected virtual address.

(S302-4) The processor 111 searches the memory space management table 200 for the entry in the cache area 141 of the memory 112 of the storage controller 110.

(S302-5) The processor 111 identifies a physical address corresponding to the selected virtual address based on the searched entry. The above is the description of the processing in step S302.

Next, the processor 111 ensures an area of the predetermined size in the memory 122 of the accelerator 120 (step S303). Specifically, the following processing is executed.

(S303-1) The processor 111 searches the memory access permission table 300 for the entry of the accelerator 120. Here, it is assumed that the entry of the accelerator 120 that is directly connected to the storage controller 110 is searched.

(S303-2) The processor 111 refers to the row corresponding to the memory 122 of the accelerator 120 of the virtual address 302 of the searched entry. The processor 111 selects the virtual address in a predetermined range based on the referenced row. At this time, a use state of the storage area of the memory 112 corresponding to the virtual address may be confirmed.

(S303-3) The processor 111 executes the exclusive processing on the selected virtual address.

(S303-4) The processor 111 searches the memory space management table 200 for the entry of the accelerator 120.

(S303-5) The processor 111 identifies the physical address corresponding to the selected virtual address based on the searched entry. The above is the description of the processing in step S303.

Next, the processor 111 transmits the read instruction including the physical address of the memory 122 identified in step S303 to the drive 130 (step S305). Thereafter, the processor 111 completes the processing.

When it is determined in step S301 that the data to be read is not the user data 151, the processor 111 ensures the area of the predetermined size in the buffer area 142 of the memory 112 of the storage controller 110 (step S304). Specifically, the following processing is executed.

(S304-1) The processor 111 searches the memory access permission table 300 for the entry of the storage controller 110.

(S304-2) The processor 111 refers to the row corresponding to the memory 112 of the storage controller 110 of the virtual address 302 of the searched entry. The processor 111 selects the virtual address in a predetermined range based on the referenced row. At this time, a use state of the storage area of the memory 112 corresponding to the virtual address may be confirmed.

(S304-3) The processor 111 executes the exclusive processing on the selected virtual address.

(S304-4) The processor 111 searches the memory space management table 200 for the entry of the buffer area 142 of the memory 112 of the storage controller 110.

(S303-5) The processor 111 identifies the physical address corresponding to the selected virtual address based on the searched entry. The above is the description of the processing in step S303.

Next, the processor 111 transmits the read instruction including the physical address of the buffer area 142 of the memory 112 identified in step S303 to the drive 130 (step S305). Thereafter, the processor 111 completes the processing.

Figure 7:
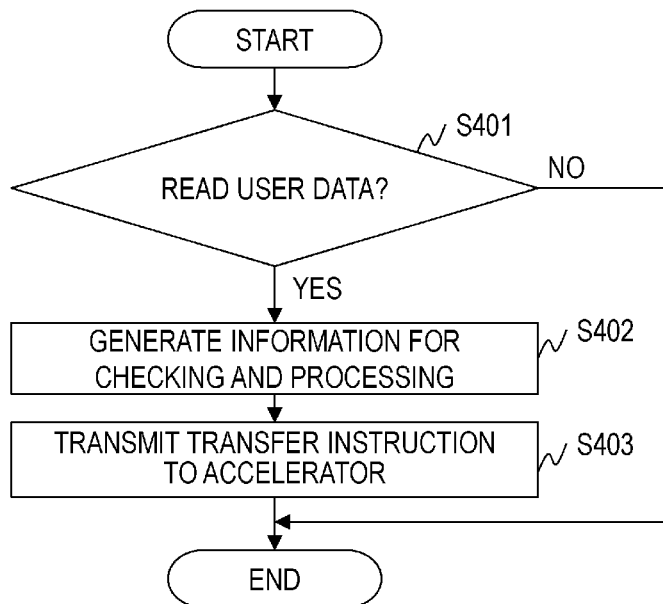
FIG. 7 is a flowchart showing an example of processing executed when the storage controller according to the first embodiment receives a read result from the drive.

FIG. 7 is a flowchart showing an example of processing executed when the storage controller 110 according to the first embodiment receives the read result from the drive 130.

The processor 111 determines whether the data to be read is the user data 151 (step S401). In step S401, a determination result in step S301 may be used as it is.

When it is determined that the data to be read is not the user data 151, the processor 111 completes the processing.

When it is determined that the data to be read is the user data 151, the processor 111 generates at least one of information for checking and information for processing (step S402).

Here, the information for checking is information for executing data check. The data check includes a bit error check, an error check for an access point, and the like. The information for processing is information for executing data processing. The data processing includes compression, expansion, and conversion of position information. The conversion of the position information means a conversion between the position information of the data before compression and the position information of the data after compression.

In the following description, when the data check and the data processing are not distinguished, the data check and the data processing are also described as optional processing.

Next, the processor 111 transmits the transfer instruction to the accelerator 120 (step S403). Thereafter, the processor 111 completes the processing. The transfer instruction includes the physical address of the area ensured in step S302 and at least one of the information for checking and the information for processing.

Figure 8:
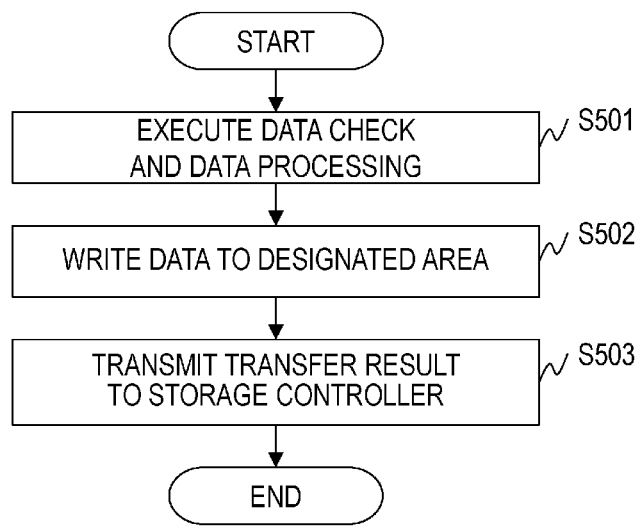
FIG. 8 is a flowchart showing an example of processing executed when an accelerator according to the first embodiment receives a transfer instruction.

FIG. 8 is a flowchart showing an example of processing executed when the accelerator 120 according to the first embodiment receives the transfer instruction.

The dedicated circuit 121 executes the optional processing on the data stored in the memory 122 based on the information included in the transfer instruction (step S501).

Specifically, the dedicated circuit 121 executes at least one of the data check and the data processing.

Next, the dedicated circuit 121 writes the data for which the optional processing is executed in the area of the memory 112 designated by the physical address included in the transfer instruction (step S502).

Next, the dedicated circuit 121 transmits the transfer result to the storage controller 110 (step S503).

In the related-art data read processing, the drive 130 writes the data to the buffer area 142, and the processor 111 writes the data from the buffer area 142 to the cache area 141, and then transmits the data to the host terminal 101.

On the other hand, in the first embodiment, the drive writes the data to the memory 122 of the accelerator 120, the accelerator 120 writes the data to the memory 112 of the storage controller 110, and the processor 111 transmits the data written in the memory 112 to the host terminal 101. As a result, in the data read processing, the transfer of the erroneous data from the drive 130 can be prevented, and the amount of consumption of the memory band can be reduced.

Further, by causing the accelerator 120 to execute any one of the data check and the data processing, a processing load of the storage controller 110 can be reduced, and the reliability, the speed-up, and the reduction of the data capacity of the data transfer can be achieved.

The invention is not limited to the above embodiments, and includes various modifications. For example, the embodiments described above are detailed for easy understanding but the invention is not necessarily limited to including all the above configurations. A part of a configuration of the embodiments may be deleted and may be added and replaced with another configuration.

The configurations, functions, processing units, processing methods or the like described above may be partially or entirely implemented by hardware such as through design using an integrated circuit. Further, the invention can also be implemented by a program code of software that implements the functions of the embodiment. In this case, a storage medium storing the program code is provided to a computer, and a processor provided in the computer reads out the program code stored in the storage medium. In this case, the program code itself read out from the storage medium implements the functions of the above-mentioned embodiment, and the program code itself and the storage medium storing the program codes constitute the invention. The storage medium for supplying the program code includes, for example, a flexible disk, a CD-ROM, a DVD-ROM, a hard disk, a solid state drive (SSD), an optical disk, a magneto-optical disk, a CD-R, a magnetic tape, a nonvolatile memory card, and a ROM.

Further, the program code for realizing the functions described in the present embodiment can be implemented in a wide range of programs or script languages such as assembler, C/C++, perl, Shell, PHP, Python and Java (registered trademark).

Further, the program code of the software that realizes the functions of the embodiments may be stored in a storage section such as a hard disk or a memory of a computer or a storage medium such as a CD-RW or a CD-R by being delivered via a network, and a processor provided in the computer may read out and execute the program code stored in the storage section or the storage medium.

In the embodiments described above, control lines and information lines are considered to be necessary for description, and all control lines and information lines are not necessarily shown in the product. All configurations may be connected to each other.

What is claimed is:

1. A storage system comprising:
at least one arithmetic unit configured to receive an input and output request and perform data input and output processing;
a first memory coupled to the at least one arithmetic unit;
a second memory coupled to the at least one arithmetic unit; and
a plurality of storage drives configured to store data; wherein
the at least one arithmetic unit is configured to instruct at least one of the storage drives to read data,
the at least one of the storage drives is configured to read the data and store the data in the second memory,
the at least one arithmetic unit is configured to:
execute optional processing on the data stored in the second memory and store the data in the first memory; and
transmit the data stored in the first memory to a request source of a read request for the data, and
the optional processing is either processing to confirm an error of the data or processing to process the data.

2. The storage system according to claim 1, further comprising a first arithmetic unit and a second arithmetic unit, wherein
the first arithmetic unit is configured to instruct to read the data to the at least one of the storage drives and transmit the data to the request source of the read request for the data, and
the second arithmetic unit is configured to perform execution of the optional processing on the data stored in the second memory and storing the data in the first memory.

3. The storage system according to claim 2, wherein
the first arithmetic unit is configured to instruct the at least one storage drive to read the data before receiving the read request, and transmit the data to the request source when the read request is received.

4. The storage system according to claim 3, wherein destruction of data in the first memory by the at least one storage drive is prevented by preventing the first memory from being accessed by the at least one storage drive.

5. The storage system according to claim 4, wherein the first arithmetic unit is configured to transmit an instruction to the second arithmetic unit to move the data from the second memory to the first memory, the instruction includes information for executing the optional processing on the data, and the second arithmetic unit is configured to execute the optional processing on the data stored in the second memory based on the information, and write the data for which the optional processing is executed in the first memory.

6. The storage system according to claim 2, wherein the first arithmetic unit and the first memory are provided in a controller, and the second arithmetic unit and the second memory are provided in an accelerator.

7. An input and output control method executed by a storage system, the storage system including:

at least one arithmetic unit configured to receive an input and output request and perform data input and output processing;

a first memory coupled to the at least one arithmetic unit;

a second memory coupled to the at least one arithmetic unit; and a plurality of storage drives configured to store data, the input and output control method comprising the steps of:

instructing, by the at least one arithmetic unit, at least one of the storage drives to read data;

reading, by the at least one of the storage drives, the data and storing the data in the second memory;

executing, by the at least one arithmetic unit, optional processing on the data stored in the second memory and storing the data in the first memory; and transmitting, by the at least one arithmetic unit, the data stored in the first memory to a request source of a read request for the data, wherein the optional processing is either processing to confirm an error of the data or processing to process the data.

8. The input and output control method according to claim 7, wherein the storage includes a first arithmetic unit and a second arithmetic unit, the input and output control method further comprising the steps of:

instructing, by the first arithmetic unit, to read the data to the at least one of the storage drives and transmitting the data to the request source of the read request for the data; and performing, by the second arithmetic unit, execution of the optional processing on the data stored in the second memory and storing the data in the first memory.

9. The input and output control method according to claim 8, further comprising the step of:

instructing, by the first arithmetic unit, the at least one storage drive to read the data before receiving the read request, and transmitting the data to the request source when the read request is received.

10. The input and output control method according to claim 9, wherein destruction of data in the first memory by the at least one storage drive is prevented by preventing the first memory from being accessed by the at least one storage drive.

11. The input and output control method according to claim 10, further comprising the steps of:

transmitting, by the first arithmetic unit, an instruction to the second arithmetic unit to move the data from the second memory to the first memory, wherein the instruction includes information for executing the optional processing on the data; and executing, by the second arithmetic unit, the optional processing on the data stored in the second memory based on the information, and writing the data for which the optional processing is executed in the first memory.

12. The input and output control method according to claim 8, wherein the first arithmetic unit and the first memory are provided in a controller, and the second arithmetic unit and the second memory are provided in an accelerator.

* * * * *